United States Patent
Kimura et al.

(10) Patent No.: US 6,383,656 B1
(45) Date of Patent: May 7, 2002

(54) PERFORM FOR METAL MATRIX COMPOSITE MATERIAL AND CYLINDER BLOCK MADE OF THE SAME

(75) Inventors: Koichi Kimura; Mitsushi Wadasako; Koji Iwata; Kazumi Kaneda; Tsuyoshi Kobayashi; Takahiro Iida, all of Hamamatsu; Toshiro Shimamoto; Susumu Kawamoto, both of Kyoto; Syunsuke Yabuuchi, Yokohama, all of (JP)

(73) Assignees: Nichias Corporation; Mitsubishi Jidosha Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/590,265

(22) Filed: Jun. 9, 2000

(30) Foreign Application Priority Data

Jun. 11, 1999 (JP) .......................................... 11-165117

(51) Int. Cl.$^7$ ............................................... C22C 1/09
(52) U.S. Cl. .................... 428/539.5; 428/632; 428/633; 428/212; 428/220; 428/293.1; 501/95.1; 501/95.2
(58) Field of Search ............................... 428/539.5, 632, 428/633, 212, 220, 293.1; 501/95.1, 95.2

(56) References Cited

U.S. PATENT DOCUMENTS

| | | | | |
|---|---|---|---|---|
| 4,817,578 A | * | 4/1989 | Ushio et al. | |
| 5,369,064 A | * | 11/1994 | Ohashi et al. | |
| 5,131,356 A | * | 7/1995 | Sick et al. | |
| 5,727,511 A | * | 3/1998 | Omura et al. | |
| 5,972,489 A | * | 10/1999 | Li et al. | |

FOREIGN PATENT DOCUMENTS

| | | |
|---|---|---|
| DE | 26 44 272 | 4/1977 |
| EP | 0 340 957 | 11/1989 |
| EP | 0 739 668 | 10/1996 |
| JP | 63-149342 | 6/1988 |
| JP | 2-194132 | 7/1990 |
| JP | 3-44432 | 2/1991 |
| JP | 4-11612 | 3/1992 |
| JP | 5-33295 | 5/1993 |
| JP | 8-9093 | 1/1996 |
| JP | 9-14045 | 1/1997 |

OTHER PUBLICATIONS

Patent Abstracts of Japan, vol. 012, No. 410 (C–540), Oct. 28, 1988 & JP 63 149342 A (Nippon Light Metal Co Ltd.), Jun. 22, 1988 (Jun. 6, 1988).

* cited by examiner

*Primary Examiner*—Blaine Copenheaver
*Assistant Examiner*—Jason Savage
(74) *Attorney, Agent, or Firm*—Nixon & Vanderhye

(57) ABSTRACT

A preform for metal matrix composite material comprising: inorganic particles, small-diameter inorganic fibers, and large-diameter inorganic fibers. An average particle diameter of the inorganic particles is 1 to 50 μm. An average fiber diameter of the small-diameter inorganic fibers is 2 to 5 μm, and an average fiber length of the small-diameter inorganic fibers is 10 to 200 μm. An average fiber diameter of the large-diameter inorganic fibers is 4 to 20 μm, and an average fiber length of the large-diameter inorganic fibers is 10 to 200 μm. The small-diameter inorganic fibers catch and disperse the inorganic particles in a process of forming a formed body, and the large-diameter inorganic fibers create voids in cooperation with the small-diameter inorganic fibers in the process of forming the formed body.

5 Claims, 2 Drawing Sheets

PERFORM FOR METAL MATRIX COMPOSITE MATERIAL AND CYLINDER BLOCK MADE OF THE SAME

BACKGROUND OF THE INVENTION

1. Field of the Invention

The present invention relates to a preform for metal matrix composite and a cylinder block made by pouring molten matrix metal into a preform. More specifically, the present invention relates to a preform including a porous structure made of inorganic materials such as inorganic particles and inorganic fibers.

2. Description of the Related Art

A cylinder block of an engine for automobile is well known in which metal matrix such as aluminum alloy is cast round a cylinder liner made of cast iron. This type cylinder block is manufactured by the following conventional manufacturing method. First, a cylinder liner made of cast iron, which is manufactured in a different manufacturing process, is arranged in a casting mold of a cylinder block, and then molten metal of aluminum alloy is poured into the casting mold, so that the cylinder block can be obtained. An inner circumferential face of the cylinder liners in the cylinder block is polished so as to form a sliding face on which a piston slides. This cylinder block includes the cylinder liner made of cast iron as described above. Therefore, the cylinder block is heavy. Further, since this cylinder block is made of different metals of cast iron and aluminum alloy, the coefficients of thermal expansion of which are different from each other. Therefore, there are problems of lower characteristics in that the different metals can be tightly joined to each other and that heat can be efficiently radiated or not. In order to solve the above problems, a large number of cylinder blocks are proposed in which the cylinder liners are made of aluminum alloy. These cylinder blocks are disclosed in Japanese Examined Patent Publication Nos. Hei. 4-11612, Hei. 5-33295 and Hei. 8-9093.

This type cylinder block, the cylinder liner of which is made of aluminum alloy, is manufactured as follows. First, a porous structure made of inorganic fibers such as aluminum fibers or carbon fibers is formed into a predetermined shape. That is, the porous structure made of inorganic fibers is formed into a shape of a cylinder liner. This porous structure, which is formed into a predetermined shape, is referred to as a preform in this specification, hereinafter. The thus obtained preform is arranged in the casting mold for casting the cylinder block, and aluminum alloy is poured into the casting mold, so that molten aluminum alloy is impregnated into voids formed in the preform. In this way, the cylinder block is obtained. The cylinder block taken out from the casting mold after cooling is composed in such a manner that the cylinder liner is made of fiber reinforced composite material, the frame of which is the preform, and the entire body of the cylinder is made of aluminum alloy by means of integral casting.

Japanese Unexamined Patent Publication Nos. Sho. 63-149342, Hei. 2-194132, Hei. 3-44432 and Hei. 9-14045 disclose a preform, which is a porous structure, made of not only inorganic fibers but also ceramic particles. In Japanese Unexamined Patent Publication No. Hei. 9-14045, there is a description that a preform made of ceramic particles and short fibers of alumina is suitable for fiber reinforced metallic material because no deformation, crack, deflection and defective impregnation into metallic matrix are caused in the process of manufacturing the preform of a cylinder liner.

In Japanese Unexamined Patent Publication No. Hei. 3-44432, there is a description that a porous body, which is obtained when short fibers, inorganic particles and binder are mixed with each other and subjected to sucking dehydrating formation, can lead to a good fiber reinforced metallic material. In this example, the average fiber diameter of short fibers is not more than 1 μm, and the average particle diameter of inorganic particles is 10 to 50 μm.

The preform of the above conventional example is advantageous as follows. When the preform is made, heat-resistant fiber material such as inorganic fibers are used. Therefore, appropriate voids are formed in the preform, and the metal matrix can be easily impregnated into the voids, and further the inorganic fibers are entangled with each other at random, so that the mechanical strength of the preform can be enhanced. However, fiber material is a secondary processed product. Therefore, fiber material is generally expensive. For example, when inorganic fiber material is compared with inorganic particle material, the price of the inorganic fiber material is 10 times as high as that of the inorganic particle material. Accordingly, when the preform is made of only fiber material, the price of a final product such as the price of a cylinder block is raised.

Therefore, a conventional example in which a portion of the fiber materials are replaced with ceramics, metals, intermetallic compounds and carbon particles is very advantageous in that the high performance of fiber materials as a preform can be compatible with the price of the preform. However, when inspection is made into the above conventional example, the above method is disadvantageous in that dehydration can not be sufficiently conducted in the process of sucking dehydrating formation in the process of manufacturing the perform, so that the productivity is lowered. To be specific, the preform is made in such a manner that slurry containing fiber materials and ceramic particles is put into a mold of a predetermined shape and subjected to sucking dehydrating formation through a filter, and then dried and baked. In this process of sucking dehydrating formation, clogging of the filter is caused, and the dehydrating property is remarkably deteriorated, and the productivity is lowered.

Further, according to the inspection of the conventional example, the following problems are found. Voids among the fiber materials tend to be densely filled with inorganic particles such as ceramic particles, and the thus obtained preform is difficult to impregnate with molten metal of metallic matrix. In this case, if the impregnation of molten metal is forcibly conducted, the preform is given an excessively high pressure, and cracks and deformation are caused in the preform. When the metal group composite material obtained from this preform is applied to the cylinder liner of a cylinder block, the cylinder liner is damaged and deformed.

SUMMARY OF THE INVENTION

It is an object of the present invention to provide a preform and a cylinder block having cylinder liners made of fiber reinforced metallic composite material, the abrasion resistance property of which is high.

In order to solve the above problems, the present inventors made investigation in earnest and found the followings. A porous structure is made to be a preform of a cylinder liner, and the preform is impregnated with metallic matrix so as to make the cylinder liner, and this cylinder liner is incorporated into a cylinder block. In this case, it is possible to provide a cylinder block of high heat-resistance, high mechanical strength and high abrasion resistance when the porous structure is made as follows. Heat-resistance fiber materials are divided into small-diameter inorganic fibers, the average fiber diameter of which is 2 to 5 μm and the average fiber length of which is 10 to 200 μm, and large-diameter inorganic fibers, the average fiber diameter of which is 4 to 20 μm and the average fiber length of which is 10 to 200 μm. These small-and large-diameter inorganic fibers and inorganic particles, the average particle diameter of which is 1 to 50 μm, are dispersed in water together with binder and put into a mold of an objective shape such as a cylinder liner and then subjected to sucking dehydrating formation through a filter. Then, the small-diameter inorganic fibers mainly catch the inorganic particles, so that the inorganic particles are dispersed in the preform and prevented from being densely filled into voids among the large-diameter inorganic fibers so as to enhance the sucking dehydrating forming property. Further, this action of the small-diameter inorganic fibers to catch the inorganic particles contributes to enhance the abrasion resistance property of the finally obtained metal matrix composite material. On the other hand, the large-diameter inorganic fibers create voids of an appropriate size in the preform, so that the sucking dehydrating forming property can be enhanced and the molten metal of the metallic matrix can be easily impregnated into the preform. Accordingly, when the fiber reinforced metallic composite material is cast into a cylinder block so that it can be formed into a cylinder liner, it is possible to provide a cylinder block of high heat-resistance, high mechanical strength and high abrasion resistance. In this way, the present invention has been accomplished.

The first aspect of the present invention provides a preform and a cylinder block having a cylinder liner made by impregnating a preform. The preform is composed of a porous structure with a metallic matrix, the porous structure comprising: inorganic particles, the average diameter of which is 1 to 50 μm; small-diameter inorganic fibers, the average fiber diameter of which is 2 to 5 μm and the average fiber length of which is 10 to 200 μm, the small-diameter inorganic fibers mainly catching and dispersing the inorganic particles in the process of forming a formed body; and large-diameter inorganic fibers, the average fiber diameter of which is 4 to 20 μm and the average fiber length of which is 10 to 200 μm, the large-diameter inorganic fibers creating voids in cooperation with the small-diameter inorganic fibers in the process of forming the formed body.

The second aspect of the present invention provides the preform and the cylinder block made from the preform in which the average fiber diameter ($d_1$) of the small inorganic fibers and the average fiber diameter ($d_2$) of the large inorganic fibers are in the relation of $2d_1 < d_2$.

The third aspect of the present invention provides the preform and the cylinder block made from the preform in which the percentage of voids in the porous structure is 50 to 90%.

The fourth aspect of the present invention provides the preform and the cylinder block made from the preform in which the volume ($V_1$) of the inorganic particles and the volume ($V_2$) of the small-diameter inorganic fibers and large-diameter inorganic fibers are in the relation of $V_1/V_2 =$ 0.5 to 2.

The fifth aspect of the present invention provides the preform and the cylinder block made from the preform in which the ratio of ($100 \times V_s/V_2$) of the volume ($V_s$) of the small-diameter inorganic fibers to the volume ($v_2$) of the small and large-diameter inorganic fibers is 20 to 80%.

The sixth aspect of the present invention provides the preform for metal matrix composite material, further comprising both carbon fibers and carbon particles or comprising one of carbon fibers and carbon particles and furthermore comprising alumina particles, the volume fraction of which is 7 to 11%.

DETAILED DESCRIPTION OF THE PREFERRED EMBODIMENTS

Figure 1:
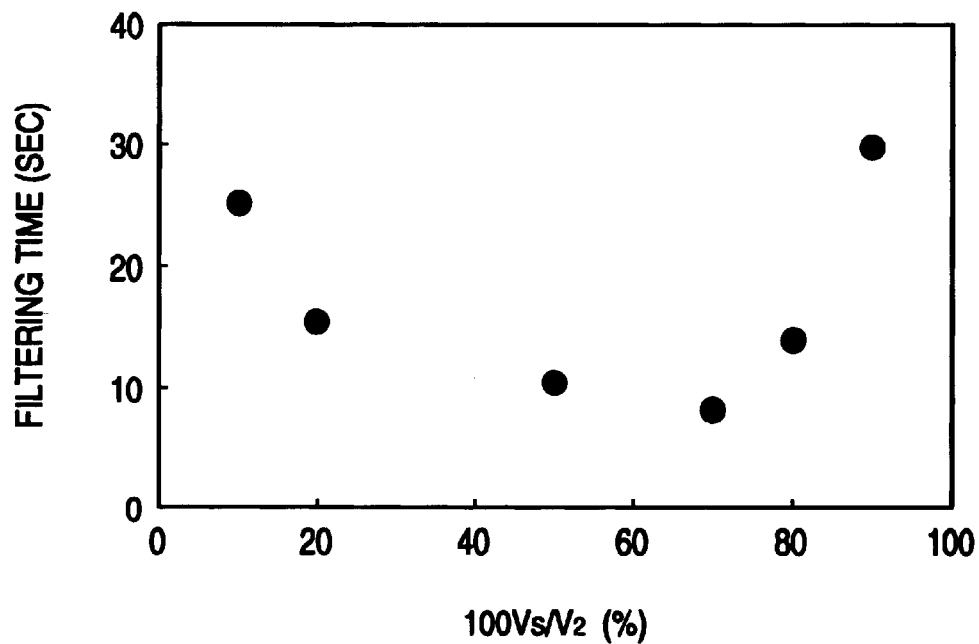
FIG. 1 is a characteristic diagram showing a relation between the ratio of $100(\%) \times V_s/V_2$ in the porous structure, which is an embodiment of the present invention, and the filtering time.

In the present invention, the porous structure means the structure of pores itself, and the preform means a body made of the porous structure having a specific shape such as a cylinder liner. That is, the preform means a body made of the porous structure into which molten metal of the metal matrix is to be poured.

Concerning the inorganic particles used for the present invention, the average particle size of the inorganic particles is in the range from 1 to 50 μm. As long as the inorganic particles can resist the high temperature when molten metal of the metal matrix is impregnated into the porous structure, any inorganic particles may be used. Examples of the usable inorganic particles are metallic oxide, metallic carbide and metallic nitride of aluminum, silicon, titanium, zirconium, magnesium, boron and iron. They are used alone or being combined with each other. Specific examples are alumina powder, mullite powder, cordierite powder and silica powder. In the case where the preform of the porous structure is used for a cylinder liner which requires the abrasion resistance property, it is preferable to select inorganic particles capable of resisting abrasion.

Concerning the small-diameter inorganic fibers used for the present invention, the average fiber diameter is in the range from 2 to 5 μm, and the average fiber length is in the range from 10 to 200 μm. As long as the small-diameter inorganic fibers can resist the high temperature when molten metal of the metal matrix is impregnated into the porous structure, any small-diameter inorganic fibers may be used. Examples of the small-diameter inorganic fibers are alumina fibers, alumina silica fibers, glass fibers, carbon fibers, ceramic fibers, mullite fibers, asbestos and rock fibers. They are used alone or being combined with each other.

Concerning the large-diameter inorganic fibers used for the present invention, the average fiber diameter is in the range from 4 to 20 μm, and the average fiber length is in the range from 10 to 200 μm. As long as the large-diameter inorganic fibers can resist the high temperature when molten metal of the metal matrix is impregnated into the porous structure, any large-diameter inorganic fibers may be used. Therefore, the same inorganic fibers as the small-diameter inorganic fibers can be used.

In this connection, the small-diameter and the large-diameter inorganic fibers are made of inorganic material, however, it is possible to use organic fibers in the future as long as the organic fibers are heat-resistant.

Concerning the binder for binding the inorganic particles with the small-diameter and the large-diameter inorganic fibers, it is possible to use any binder as long as it can conduct binding by heat treatment and the binding strength is high so that it can be used as a preform. Examples of the usable binders are powder-shaped binder such as frit, colloidal silica and alumina sol. They can be used alone or being combined with each other.

In the present invention, it is preferable that the average fiber diameter ($d_1$) of the small-diameter inorganic fibers and the average fiber diameter ($d_2$) of the large-diameter inorganic fibers are in the relation of $2d_1<d_2$, or more preferable in the relation of $3d_1<d_2$. When the above relation between $d_1$ and $d_2$ is not kept, the aforementioned action and effect, which are obtained by dividing the inorganic fibers into the small-diameter and the large-diameter inorganic fibers, are reduced, which is not preferable.

It is preferable that the percentage of voids of the porous structure is 50 to 90%. In this case, the volume percentage of the porous structure is 10 to 50%. When the percentage of voids of the porous structure is lower than 50%, it becomes difficult to impregnate the metallic matrix into the porous structure. When the percentage of voids of the porous structure is higher than 90%, the mechanical strength of the porous structure itself is decreased.

In the above porous structure, it is preferable that volume $V_1$ of the inorganic particles and volume $V_2$ of the small-diameter inorganic fibers and large-diameter inorganic fibers are in the relation of $V_1/V_2=0.5$ to 2. When the ratio of $V_1/V_2$ is lower than 0.5, there is a tendency that the abrasion resistance of the reinforced metal, which is the finally obtained metal matrix composite material, is lowered. The inorganic particles are mainly caught by the small-diameter inorganic fibers, so that the abrasion resistance can be enhanced. Therefore, when $V_1$ is low, the abrasion resistance property is lowered. On the contrary, when $V_1/V_2$ exceeds 2, the quantity of the inorganic particles becomes too much. Therefore, when the porous structure is formed, the sucking dehydrating formation property is deteriorated, and the productivity is lowered.

In the above porous structure, it is preferable that the ratio of ($100\times V_0/V_2$), is 20 to 80%. In this ratio, $V_2$ is a total volume of the small-and large-diameter inorganic fibers, and $V_o$ is a volumes of the small-diameter inorganic fibers. It is more preferable that the ratio of ($100=V_s/V_2$) is 50 to 70%. When this ratio is lower than 20%, existence of voids among the fibers created by the large-diameter inorganic fibers becomes remarkable, and the quantity of the small-diameter inorganic fibers is decreased. Accordingly, it becomes difficult to catch the inorganic particles in the case of forming the porous structure, which causes the clogging of the filter, and the sucking dehydrating formation property is deteriorated. Further, the voids formed among the large-diameter fibers are densely filled with the inorganic particles, which makes it difficult to impregnate the metallic matrix into the porous structure. On the contrary, when this ratio exceeds 80%, the quantity of the small-diameter inorganic fibers is increased. Therefore, too many voids (small voids) are formed among the small-diameter fibers, and the sucking dehydrating formation property is lowered, and it becomes difficult for molten metal of the metallic matrix to impregnate into the voids formed along the large-diameter fibers.

According to the above tendency, it can be said that there is a correlation between the sucking dehydrating formation property of the porous structure and the impregnation property of the molten matrix metal. In any case, when the ratio ($100=V_oV_2$) is out of the range from 20 to 80%, the sucking dehydrating formation property is deteriorated when the porous structure is formed. Further, it becomes difficult for the molten metal of the metal matrix to impregnate into the porous structure, and the ratio (A) of compressive deformation of the porous structure is increased when the fiber reinforced metallic material is cast. In this case, the ratio (A) of compressive deformation is defined by the percentage of ($\Delta T$) to (T), that is, the ratio (A) of compressive deformation is defined by the expression ($A=100\times\Delta T/T$), wherein ($\Delta T$) is a difference ($T-T_2=\Delta T$) between the thickness (T) of the porous structure before casting, and the thickness ($T_a$) of the porous structure after casting.

In the present invention, the fiber reinforced metallic material is manufactured in such a manner that the frame work is made of the porous structure, and the metallic matrix is impregnated into the porous structure. Examples of the usable metallic matrix are aluminum, titanium, magnesium, nickel and copper, and alloys of these metals. In this case, aluminum alloy is most frequently used. The shape of the fiber reinforced metallic material is not particularly limited. For example, the fiber reinforced metallic material may be formed into a sheet-shape, rod-shape and angle-shape. The porous structure may be formed into an objective specific shape, that is, the porous structure may be formed into a preform, and the thus formed preform may be impregnated with aluminum alloy so that it can be formed into a specific product.

The cylinder block of the present invention is made in such a manner that the above porous structure is formed into a preform of a cylinder liner and this preform is impregnated with the metallic matrix of aluminum alloy. That is, the porous structure, fiber reinforced metallic material and cylinder block, which is composed of the porous structure and fiber reinforced metallic material, are manufactured as follows.

First, inorganic particles, small-diameter inorganic fibers and large-diameter inorganic fibers satisfying the above conditions are prepared, and the diameter of the small-diameter inorganic fibers and the diameter of the large-diameter inorganic fibers should satisfy the condition $2d_1<d_2$. The compositions of the inorganic particles, small-diameter inorganic fibers and large-diameter inorganic fibers are determined so that the following porous structure can be obtained. In the porous structure, the percentage of voids is 50 to 90%, volume $V_1$ of the inorganic particles and total volume $V_2$ of the small-diameter inorganic fibers and large-diameter inorganic fibers satisfy the expression $V_1V_2=0.5$ to 2, and volume $V_5$ of the small-diameter inorganic fibers in the above volume $V_2$ satisfies the expression $100\times V_5/V_2=20$ to 80%.

Water is dispersed in the thus obtained compound, and further binder is added to it so as to obtain slurry. This slurry is poured into a mold, the shape of which is the same as that of a cylinder liner, and dehydrated by suction and then dried. In this way, a formed body, the shape of which is the same as that of the cylinder liner, is obtained. Thus obtained formed body is baked, so that a preform of the cylinder liner, which is a porous structure, can be obtained. This preform is arranged in a mold for molding a cylinder block, and molten metal of aluminum alloy, which is the metallic matrix, is poured into the mold, so that the preform is impregnated with the molten metal of aluminum alloy. After the completion of impregnation, the preform impregnated with the molten metal of aluminum alloy is cooled and removed from the mold. In this way, the cylinder block can be provided. The cylinder liner of this cylinder block is made of fiber reinforced metallic material which is reinforced by the preform of the porous structure. Further, the cylinder liner is integrated with the cylinder block.

Next, referring to an embodiment, the present invention will be specifically explained below. However, it should be noted that the present invention is not limited by the specific embodiment.

REFERENCE EXAMPLE 1

The following starting raw materials were dispersed into water according to the following composition so as to obtain slurry.

(Starting Raw Materials)

Inorganic particles: alumina particles, the average particle size of which is 20 μm.

Small-diameter inorganic fibers: alumina silica fibers, the average fiber diameter of which is 3 μm, the average fiber length of which is 100 μm.

Large-diameter inorganic fibers: glass fibers, the average fiber diameter of which is 10 μm, the average fiber length of which is 150 μm.

Binder: glass frit and alumina sol (Compound)

The composition shown on Table 1 was adopted. On Table 1, the numerical values are compounding ratios. The volume percentage of the preform was 30%. $V_1/V_2=1.0$, wherein $V_1$ was a volume of inorganic particles and $V_2$ was a total volume of the small- and large-diameter inorganic fibers. The percentage of solid was 5%. The value of $100(\%) \times (V_5)/(V_2)$ was set at 10%, 20%, 50%, 70%, 80% and 90%, wherein $V_5$ was a volume of the small-diameter inorganic fibers and $V_2$ was a total volume of the small- and large-diameter inorganic fibers.

TABLE 1

| $100 \times (V_5)/(V_2)$ | 10% | 20% | 50% | 70% | 80% | 90% |
|---|---|---|---|---|---|---|
| Inorganic Particles $V_1$ | 100 | 100 | 100 | 100 | 100 | 100 |
| Small-diameter Inorganic Fibers $V_5$ | 10 | 20 | 50 | 70 | 80 | 90 |
| Large-diameter Inorganic Fibers | 90 | 80 | 50 | 30 | 20 | 10 |
| Glass Frit | 26 | 26 | 26 | 26 | 26 | 26 |
| Alumina Sol | 7 | 7 | 7 | 7 | 7 | 7 |
| $V_1/V_2$ | 1 | 1 | 1 | 1 | 1 | 1 |

Figure 2:
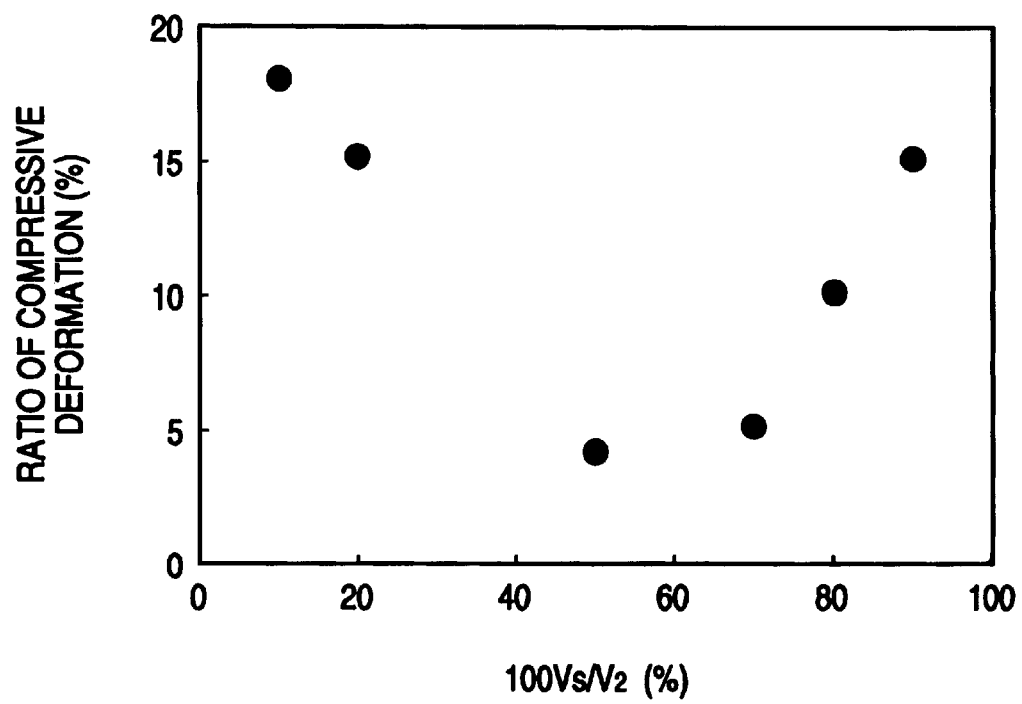
FIG. 2 is a characteristic diagram showing a relation between the ratio of $100(\%) \times V_s/V_2$ in the porous structure, which is an embodiment of the present invention, and the ratio of compressive deformation of the porous structure in the process of casting.

Next, the slurry of each composition was poured into a disk-shaped mold and dehydrated. After that, it was dried at 105° C., and a formed body (diameter: 100 mm, thickness: 10 mm) of each composition was obtained. The obtained porous structure body was subjected to the following water filtering test. The results of the test is shown in FIG. 1. Next, this porous structure body was arranged in a disk-shaped mold, and molten metal of aluminum alloy (JIS ADC12), the temperature of which was 800° C., was poured into the mold, and pressure of 1000 kg/cm² was given to the molten metal so as to impregnate the molten metal into the porous structure body. In this way, the fiber reinforced metallic material of each composition, which was reinforced by the porous structure body, was obtained. Concerning this fiber reinforced metallic material, thickness (T) of the porous structure body before casting and thickness ($T_2$) of the porous structure body after casting were measured, and the ratio of compressive deformation $A=100(T-T_a)/T$ was calculated. The results of calculations are shown in FIG. 2.

(Water Filtering Test)

The filtering time (sec) is expressed when 1 liter of slurry, the water content of which is 90%, is sucked and dehydrated through a filter, the pore diameter of which is 300 μm, under the condition of decompression −600 mmHg. Therefore, when the filtering time is long, the filtering property is not good.

As can be seen in FIG. 1, when $100 \times (V_5/V_2)$ is 50% and 70%, the filtering time is shortest. When $100 \times (V_5/V_2)$ is 10% and 90%, the filtering time is suddenly increased. Due to the foregoing, it can be known that the most appropriate value of $100 \times (V_5/V_2)$ is in the range from 20 to 80% concerning the filtering property. As can be seen in FIG. 2, when the value of $100 \times (V_5/V_2)$ is 50% and 70%, the ratio of compressive deformation is low. When the value of $100 \times (V_3/V_2)$ is 10%, 20 and 90%, the ratio of compressive deformation is high. Due to the foregoing, it can be known that the most appropriate value of $100 \times (V_5/V_2)$ is in the range from 20 to 80% also concerning the ratio of compressive deformation.

REFERENCE EXAMPLE 2

Figure 3:
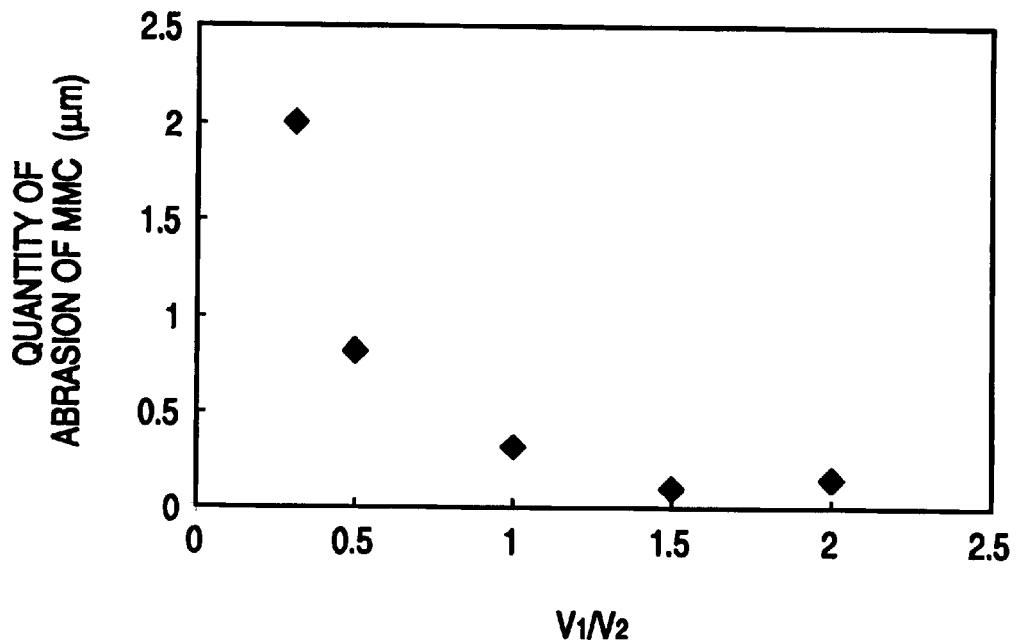
FIG. 3 is a characteristic diagram showing a relation between the ratio of $V_1/V_2$ in the porous structure, which is an embodiment of the present invention, and the quantity of abrasion of the reinforced metal material made of the porous structure of each ratio.

The value of $(V_s) \times 100(\%)/(V_2)$ was set at 50%, wherein $(V_5)$ was a volume of the small-diameter inorganic fibers and $V_2$ was a total volume of the small-diameter inorganic fibers and large-diameter inorganic fibers, and the value of $(V_1)/(V_2)$ was set at 0.3, 0.5, 1.0, 1.5 and 2.0, wherein $(V_1)$ was a volume of inorganic particles and $(V_2)$ was a total volume of the small-diameter inorganic fibers and large-diameter inorganic fibers. Except for that, the method of Reference Example 2 was the same as that of Embodiment 1. The fiber reinforced metallic material obtained in this reference example was subjected to the following abrasion test. The result of the test is shown in FIG. 3. The compound of each example is shown in Table 2. The numerical values on the table show the compounding ratio.

TABLE 2

| $V_1/V_2$ | 0.3 | 0.5 | 1.0 | 1.5 | 2.0 |
|---|---|---|---|---|---|
| Inorganic Particles $V_1$ | 23 | 33 | 50 | 60 | 67 |
| Small-diameter Inorganic Fibers $V_5$ | 38.5 | 33.5 | 25 | 20 | 16.5 |
| Large-diameter Inorganic Fibers | 38.5 | 33.5 | 25 | 20 | 16.5 |
| Glass Frit | 26 | 26 | 26 | 26 | 26 |
| Alumina Sol | 7 | 7 | 7 | 7 | 7 |
| $100 \times V_5/V_2$ | 50 | 50 | 50 | 50 | 50 |

(Abrasion Test)

A pin-shaped opponent member was made to come into pressure contact with the surface of fiber reinforced metallic material (MMC) while the load of 50 kgf was being given to the pin-shaped opponent member. While lubricant was being supplied to the contact portion by 1 ml/min, the pin-shaped opponent member was reciprocated for 2 hours under the condition that the stroke was 50 mm and the speed was 200 cycles/min. After the completion of the reciprocating motion, the quantity of abrasion of the fiber reinforced metallic material (MMC) was measured.

As shown in FIG. 3, when the ratio $V_1/V_2$ was 1.5, the quantity of abrasion was minimum. Next, when the ratio $V_1/V_2$ was 2.0 and 1.0, the quantity of abrasion was small. When the ratio $V_1/V_2$ was 3.0, the quantity of abrasion was suddenly increased.

Embodiment 1

Starting raw materials according to the composition (described below) were dispersed in water, so that slurry was obtained. The thus obtained slurry was put into a mold, the shape of which was the same as that of a cylinder liner, and dehydrated by the sucking dehydrating formation method and dried at 105° C. In this way, a forming body, the shape of which was the same as that of the cylinder liner, was obtained. This forming body was baked at 600° C. for one hour, and a preform of the cylinder liner, the dimensions of which are outer diameter 95.1 mm×length 138 mm×thickness 3.8 mm, was obtained. The volume percentage of this preform was 27%, that is, the percentage of voids of this preform was 73%, and the density was 0.6 to 0.9 g/cm³. This preform was arranged in a mold of a cylinder block, and molten metal of aluminum alloy was poured into the mold at 800° C., so that the preform was impregnated with molten metal of aluminum alloy. In this case, die casting was conducted as follows. After the preform was preheated to 400° C., it was set in a die casting machine, the clamping force of which was 300 t, and then die casting was conducted under the condition that the injection speed was 2.0 m/sec, the casting pressure was 500 kg/cm², the gate speed was 30 m/sec and the filling time was 0.17 sec. After the completion of cooling, it was removed from the mold. In this way, the cylinder block was obtained. The cylinder liner of this cylinder block was reinforced by the porous structure, and further, the cylinder was integrated with the cylinder block. Then, the surface of the cylinder liner was subjected to cutting and honing so as to obtain a sliding surface. In this way, the cylinder block product was obtained.

| | |
|---|---|
| Alumina particles (average particle diameter 20 μm) | 35 weight parts |
| Alumina silica fibers (average fiber diameter 3 μm, average fiber length 100 μm) | 10 weight parts |
| Glass fibers (average fiber diameter 10 μm, average fiber length 150 μm) | 20 weight parts |

| | |
|---|---|
| Carbon fibers (average fiber diameter 10 μm, average fiber length 60 μm, these carbon fibers were used for ensuring the sliding property required of the cylinder liner) | 10 weight parts |
| Glass frit (binder) | 20 weight parts |
| Alumina sol (binder) | 5 weight parts |

Figure 4:
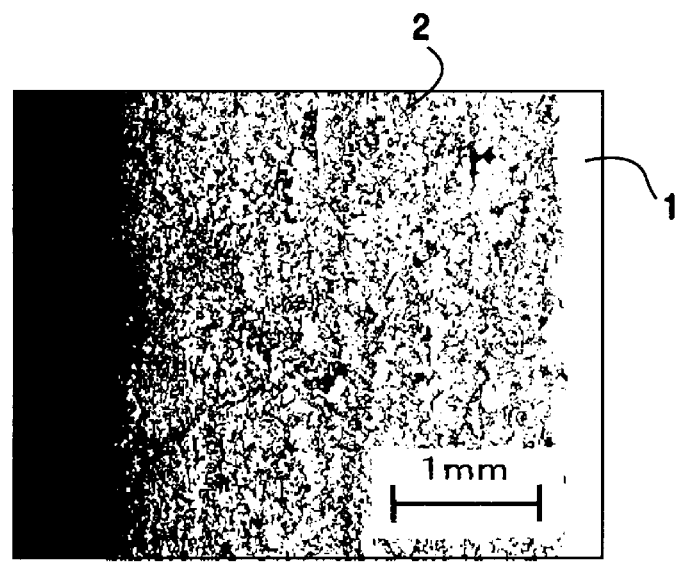
FIG. 4 is a microphotograph showing a metallic structure of the cylinder liner incorporated into the cylinder block which is an embodiment of the present invention.

FIG. 4 is a microphotograph of the metallic structure of the cylinder block. In FIG. 4, reference numeral 1 is a main body of the cylinder block, and reference numeral 2 is a cylinder liner of the cylinder block. As can be seen in FIG. 4, the ratio of compressive deformation of the preform is 7%, that is, the ratio of compressive deformation of the preform is low, and the preform is deformed only a little by the pressure of molten metal. The same abrasion test as that of Embodiment 2 was made. In this connection, in this abrasion test, the quantity of abrasion was measured in the case where the pin-shaped opponent member was a chrome plating ring, and also the quantity of abrasion was measured in the case where the pin-shaped opponent member was a nitride ring. As a result of measurement, the quantity of abrasion of MMC was approximately 1 μm, which was small, in both cases of the chrome plating ring and nitride ring.

Embodiment 2

The following starting raw materials according to the following composition were dispersed in water, so that slurry was obtained. Except for that, by the same method as that of Embodiment 1, a cylinder block was made. In the same manner as that of Embodiment 1, the abrasion test was conducted. As a result of measurement, the quantity of abrasion of MMC was approximately 1 μm, which was small, in both cases of the chrome plating ring and nitride ring.

| | |
|---|---|
| Alumina particles (average particle diameter 20 μm) | 45 weight parts |
| Alumina silica fibers (average fiber diameter 3 μm, average fiber length 100 μm) | 10 weight parts |
| Glass fibers (average fiber diameter 10 μm, average fiber length 150 μm) | 10 weight parts |
| Carbon fibers (average fiber diameter 10 μm, average fiber length 60 μm) | 10 weight parts |
| Glass frit (binder) | 20 weight parts |
| Alumina sol (binder) | 5 weight parts |

Embodiment 3

The following starting raw materials were dispersed in water according to the following composition, so that slurry was obtained. Except for that, by the same method as that of Embodiment 1, a cylinder block was made. In the same manner as that of Embodiment 1, the abrasion test was conducted. As a result of measurement, the quantity of abrasion of MMC was approximately 1 μm, which was small, in both cases of the chrome plating ring and nitride ring.

| | |
|---|---|
| Alumina particles (average particle diameter 20 μm) | 35 weight parts |
| Alumina silica fibers (average fiber diameter 3 μm, average fiber length 100 μm) | 10 weight parts |
| Glass fibers (average fiber diameter 10 μm, average fiber length 150 μm) | 20 weight parts |
| Graphite powder (average particle diameter 30 μm) | 10 weight parts |
| Glass frit (binder) | 20 weight parts |
| Alumina sol (binder) | 5 weight parts |

COMPARATIVE EXAMPLE 1

In this Comparative Example 1, on the assumption that the cylinder liner is made of silicon aluminum alloy of high density, silicon aluminum alloy of high density was used instead of MMC. Except for that, the abrasion test was made by the same method as that described before. As a result of the abrasion test, in the case where the pin was a chrome plating ring, the quantity of abrasion of silicon aluminum alloy of high density was 16 to 19 μm, and in the case where the pin was a nitride ring, the quantity of abrasion of silicon aluminum alloy of high density of 23 to 33 μm.

COMPARATIVE EXAMPLE 2

In this Comparative Example 2, on the assumption that the cylinder liner is made of FC250, FC250 was used instead of MMC. Except for that, the abrasion test was made by the same method as that described before. As a result of the abrasion test, in the case where the pin was a chrome plating ring, the quantity of abrasion of silicon aluminum alloy of high density was 1 to 2 μm, and in the case where the pin was a nitride ring, the quantity of abrasion of FC250 was 2 to 4 μm.

Compared with comparative Example 1 in which silicon aluminum alloy of high density was used and Comparative Example 2 in which FC250 was used, Embodiments 1 to 3 of the present invention showed the excellent results of the abrasion tests in which the quantity of abrasion of the piston ring plated with chrome was the same as that of the nitride piston ring.

According to the present invention, although the porous structure is composed in such a manner that a portion of the heat-resistant fiber material is replaced with inorganic particles, the preform can be easily made, and further the molten matrix metal can be easily impregnated into the preform. Therefore, the manufacturing cost can be reduced. The cylinder block of the present invention includes the porous structure and the reinforced metallic material in which the porous structure is used. Therefore, not only the manufacturing cost can be reduced, but also the abrasion resistance property of the cylinder liner can be enhanced. Further, the cylinder liner and the cylinder block can be made of the same metal, and the coefficients of thermal expansion can be made the same. Accordingly, the cylinder liner and the cylinder block can be easily fit and the radiation property can be enhanced.

While only a certain embodiment of the invention has been specifically described herein, it will be apparent that numerous modifications may be made thereto without departing from the spirit and scope of the invention.

The present invention is based on Japanese Patent Application No. Hei. 11-165117 which is incorporated herein by reference.

What is claimed is:

1. A cylinder block having a cylinder liner made by impregnating a preform including a porous structure with a metallic matrix, the porous structure comprising:

inorganic particles, an average diameter of said inorganic particles being 1 to 50 $\mu$m;

small-diameter inorganic fibers, an average diameter of said small-diameter inorganic fibers being 2 to 5 $\mu$m, and an average length of said small-diameter inorganic fibers being 10 to 200 $\mu$m; and large-diameter inorganic fibers, an average diameter of said large-diameter inorganic fibers being 4 to 20 $\mu$m, and an average length of said large-diameter inorganic fibers being 10 to 200 $\mu$m, wherein said small-diameter inorganic fibers catch and disperse said inorganic particles in a process of forming a formed body, and said large-diameter inorganic fibers create voids in cooperation with said small-diameter inorganic fibers in the process of forming the formed body.

2. The cylinder block according to claim 1, wherein the average diameter ($d_1$) of said small-diameter inorganic fibers and the average diameter ($d_2$) of said large-diameter inorganic fibers are in the relation of $2d_1 < d_2$.

3. The cylinder block according to claim 1, wherein a percentage of the voids in the porous structure is 50 to 90%.

4. The cylinder block according to claim 1, wherein a volume ($V_1$) of said inorganic particles and a volume ($V_2$) of both said small-diameter and large-diameter inorganic fibers are in the relation of $V_1/V_2 = 0.5$ to 2.

5. The cylinder block according to claim 1, wherein a volume ($V_s$) of said small-diameter inorganic fibers and a volume ($V_2$) of both said small-diameter and large-diameter inorganic fibers are in the relation of $V_s/V_2 = 0.2$ to 0.8.

* * * * *